US010547452B2

(12) United States Patent
Walrant

(10) Patent No.: US 10,547,452 B2
(45) Date of Patent: Jan. 28, 2020

(54) APPARATUS AND METHOD FOR VERIFYING SECRET KEYS

(71) Applicant: NXP B.V.

(72) Inventor: Thierry G. C. Walrant, Bouge (BE)

(73) Assignee: NXP B.V., Eindhoven (NL)

( * ) Notice: Subject to any disclaimer, the term of this patent is extended or adjusted under 35 U.S.C. 154(b) by 198 days.

(21) Appl. No.: 15/867,406

(22) Filed: Jan. 10, 2018

(65) Prior Publication Data

US 2018/0219684 A1 Aug. 2, 2018

(30) Foreign Application Priority Data

Jan. 30, 2017 (EP) ..................................... 17153801

(51) Int. Cl.
| | | |
|---|---|---|
| H04L 29/06 | (2006.01) | |
| H04L 9/32 | (2006.01) | |
| H04L 9/14 | (2006.01) | |
| H04L 9/30 | (2006.01) | |

(52) U.S. Cl.
CPC .............. *H04L 9/3242* (2013.01); *H04L 9/14* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 6,282,295 | B1 | 8/2001 | Young et al. |
| 8,302,176 | B2 | 10/2012 | Huang |
| 9,231,936 | B1 * | 1/2016 | Wang ...................... H04L 63/08 |
| 2008/0010242 | A1 * | 1/2008 | Jin ......................... G06F 21/445 |

(Continued)

FOREIGN PATENT DOCUMENTS

| | | |
|---|---|---|
| CN | 101517598 B | 8/2009 |
| CN | 101807818 B | 8/2010 |

(Continued)

OTHER PUBLICATIONS

Sharma, S. et al. "An Efficient Distributed Group Key Management Using Hierarchical Approach with Elliptic Curve Cryptography", IEEE International Conference on Computational Intelligence & Communication Technology, Ghaziabad, pp. 687-693 (2015).

(Continued)

*Primary Examiner* — Andrew J Steinle
(74) *Attorney, Agent, or Firm* — Rajeev Madnawat

(57) ABSTRACT

The present application relates to a methodology of verifying secret keys in a distributed network comprising a plurality of nodes connected to a shared medium. Each node of the plurality of nodes is member of at least one group of a plurality of groups. Each group is associated with a secret group key. A verification request is broadcast to the plurality of nodes and verification responses broadcast from the plurality of nodes are received. Each verification response comprises one code sequence for each logical group, of which the broadcasting node is member. Each code sequence of the verification request is generated on the basis of a secret group key associated with a respective logical group from a predefined data sequence. The code sequences are collected and the integrity of the plurality of nodes is confirmed by comparing the code sequences.

14 Claims, 6 Drawing Sheets

(56) References Cited

U.S. PATENT DOCUMENTS

2014/0233738 A1   8/2014   Chunduri et al.
2015/0089236 A1   3/2015   Han et al.
2016/0149908 A1*  5/2016   Unagami .............. H04L 63/061
                                                                713/170

FOREIGN PATENT DOCUMENTS

DE   10 2012 219 079 A1   4/2014
EP          3 038 318 A1   6/2016
WO         2015125197 A1   8/2015

OTHER PUBLICATIONS

Mortazavi, S. A. et al. "An efficient distributed group key management using hierarchical approach with Diffie-Hellman and Symmetric Algorithm: DHSA", International Symposium on Computer Networks and Distributed Systems (CNDS), Tehran, pp. 49-54. (2011).

Adusumilli, P. et al. "DGKD: distributed group key distribution with authentication capability",Proceedings from the Sixth Annual IEEE SMC Information Assurance Workshop, pp. 286-293 (2005).

* cited by examiner

APPARATUS AND METHOD FOR VERIFYING SECRET KEYS

CROSS-REFERENCE TO RELATED APPLICATIONS

This application claims the priority under 35 U.S.C. § 119 of European Patent application no. 17153801.0, filed on Jan. 30, 2017, the contents of which are incorporated by reference herein.

FIELD OF THE INVENTION

The present invention relates to distributed network communication technology, and specifically, to confidential key verification methodologies within a distributed network.

BACKGROUND

In any distributed networks, integrity and/or confidentially of data communication is a core aspect when using such distributed networks in security and/or safety sensitive environments. Integrity of data communication comprises the integrity of the data communicated over the communication medium of a distributed network and the integrity of the network devices participating in the data communication. An illegitimate network device may compromise the data communication on the distributed network.

A Fieldbus CAN (Controller Area Network), which is the abbreviation of Controller Area Network, is an example of a typical distributed network, which interconnects several electronic control units (ECUs) via a shared wired communication medium. The fieldbus CAN is typically used for decentralized control functions in safety relevant environments. Compared to other field bus, the fieldbus CAN has a high reliability, low cost and other advantages, so it has been widely used. In particular, CAN bus plays an important role in intelligent control system and provides an open communications platform to allow for real-time exchange of data between the networked units.

The open nature of interconnection to distributed networks such as the fieldbus CAN communication system implies insecurity. Because broadcast packet mode communication, illegal access to the listeners can get the channel data. Moreover in case of open protocol standards, the data can easily be interpreted as meaningful information, illegitimate networked units can easily intercept bus messages, posing legal unit control, to bring great security risk, which for high safety requirements for intelligent system is unacceptable, and therefore need to consider the integrity and confidentiality of data communications. Integrity and confidentiality of data communications is typically obtained by using authentication and/or encryption based on shared secrets shared among legitimate networked units.

SUMMARY

The present invention provides an apparatus for verifying secret keys in a distributed network and a method of verifying secret keys in a distributed network as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
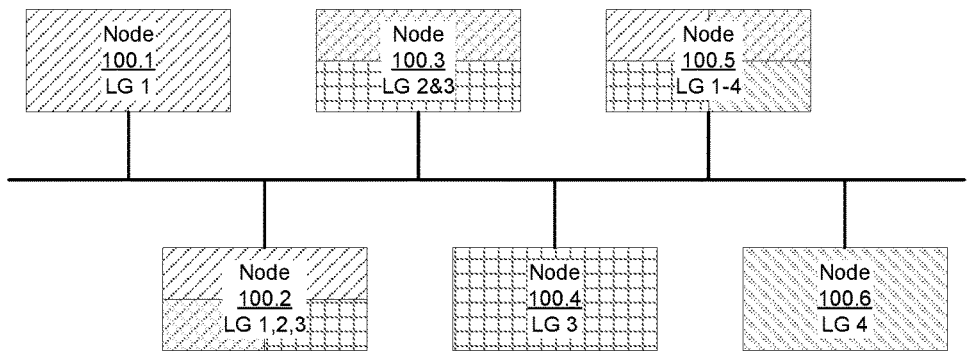
FIG. 1 schematically illustrates a block diagram a CAN bus system comprising a plurality of networked nodes or ECU, electronic control units, capable of exchanging data messages between them using the CAN bus as a shared communication medium according to an example of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 shows a block diagram of a CAN bus system comprising a plurality of networked nodes or ECU, electronic control units, capable of exchanging data messages between them using the CAN bus as a shared communication medium. The illustrated CAN bus is an example of a data bus designed to allow microcontrollers and devices to communication with each other without a host controller. The CAN bus is a message-based protocol originally designed for automotive applications, but also used in other areas such as aerospace, maritime, industrial automation, medical equipment, and the like. A typical modern automobile may have as many employ 50 or more electronic control units (ECUs) for various subsystems, including individual control units for the engine, transmission, vehicle telematics, airbags, antilock braking/ABS, cruise control, electric power steering, audio systems, power windows, doors, mirror adjustment, battery systems, etc. Accordingly, a CAN bus may be used in vehicles to connect an engine control unit with a transmission control unit, etc. Those skilled in the art will understand that although the present description will relate to fieldbus CAN network(s) for the sake of explanation, the illustrated fieldbus CAN implementations are for the sake of illustration only. The teaching of the present application is applicable with any distributed network, which interconnects a plurality of networked units via a shared communication medium and in which the integrity and/or confidentiality of the communicated data is a desire and requirement, respectively.

For instance, in order to prevent from false data injection attacks in any systems that may employ a CAN bus the so-called nodes may be grouped into logical groups, each of which is associated with a secret group key. A secret group key is a shared secret, which is shared only among those nodes, which are assigned to or member of a same logical group. The secret group keys may be used to enable an isolation, authentication and/or encryption of the message communication on the CAN bus. Isolation and/or authentication may be obtained in that messages communicated on the CAN bus are associated with message authentication codes (MACs) generated on the basis of secret group keys. Encryption may be obtained in that messages communicated on the CAN bus comprise payload, which is at least partially encrypted on the basis of the secret group keys.

The nodes enabled for communicating on the CAN bus are assigned to one or more logical groups LGs. The nodes, which are member of a logical group, communicate with each other via a logical channel on the CAN bus by using message authentication codes (MACs) based on the secret group keys. Hence, data messages are associated to virtual channels. Each virtual channel carries data messages, which comprises data intended for one or more nodes being member of a respective logical group. A message authentication code valid for a logical group can only be successfully generated by a sender node, which knows the secret group key associated with the respective logical group, and a valid message authentication code can only be successfully verified by a receiver node, which knows the secret group key associated with the respective logical group. The sender node and the receiver node are member of the same logical group. Hence, an isolation of the data communication on the CAN bus in virtual channels of the virtual groups is obtained insofar as only nodes, which are member of the same group can generate and authenticate data messages carried on the virtual channel. Isolation and further confidentiality of the communication data may be also obtained by encrypting the data payload or a part thereof based on the secret group keys.

As illustratively shown in FIG. 1, each of the nodes 100.1 to 100.6 may be assigned to one or more logical groups, herein the example logical groups LG 1 to LG 4. The logical group LG 1 comprises for instance the nodes 100.1, 100.2 and 100.5; the logical group LG 2 comprises for instance the nodes 100.2, 100.3 and 100.5, the logical group LG 3 comprises for instance the nodes 100.2, 100.3, 100.4 and 100.5 and the logical group LG 4 comprises for instance the nodes 100.5 and 100.6. Each message communication over the CAN bus by one of the nodes is for instance associated with a message authentication code (MAC), which may be part of the message or broadcast in a separate message associated with a respective data message. The MAC is generated on the basis of a secret group key associated with a respective one of the logical groups. For instance, the node 100.1 intends to broadcast a data message to node 100.5. Both are part of the logical group LG 1. The MAC to authenticate that the data message, which should be communicated over the virtual channel of the logical group LG 1, is generated on the basis of the secret group key $K_{LID}1$, where LID abbreviates the term logical group identifier and further refers to logical group LG 1 identified by the logical group identifier 1, LID.1. Only a node, which knows the secret group key $K_{LID}.1$, is able to successfully verify the MAC. The secret group key $K_{LID}.1$ is a shared secret, which is shared only among the nodes 100.1, 100.2 and 100.5 being member of the logical group LG 1 in the present example. Hence, the exemplary nodes 100.1, 100.2 and 100.5 are enabled to successfully verify the MAC generated on the basis of the secret group key $K_{LID}.1$. For instance, nodes, which are not enabled to successfully verify the MAC may discard the data massage. Alternatively, nodes may implement specific data processing to handle message data carried by data messages, which cannot be successfully verified. Thus, a logical separation of the data communication on the shared medium into virtual channels each associated with one of the logical groups is obtained. Data messages without valid MACs may be discarded or may be handled specifically by the receiver nodes.

In some cases, the sender node may include at least a portion of the contents of the authentication message (e.g., authentication code) in the data message. Message authentication code (MAC) may be implemented for existing applications on top of the CAN protocol. For instance, if there is open space left in the data field of the data message, the sender node may use this space to carry the MAC (e.g. in form of a truncated hash value). If data field is occupied, but the deployed CAN protocol supports the extended identity field, the sender node may use this extended identity field to carry the MAC. If neither of the above methods are possible, but the deployed CAN protocol supports the extend data field (e.g. data segmentation), the sender node may use an extended CAN message to carry the MAC. If none of the above options are available, the sender node may use a separate authentication message to send the MAC. For instance, the sender node may broadcast a data message using an original protocol, and immediately after sending the data message, the sender node may broadcast a follow-up authentication message.

It should be noted that the above example of using secret group keys to provide message authentication codes is only one usage example of secret keys shared among groups of nodes. Those skilled in the art will understand from the following description that the purpose and usage strategy of the shared secret keys such as the aforementioned secret group keys is out of the scope of the present application. For the sake of a more fully understanding it should be assumed that the keys are secret keys, which are shared among nodes sorted by groups for a given purpose. The group membership should be understood as part of the bus security architecture and is predefined for each node. However, it is immediately understood that the confidentiality of shared secret keys is a general crucial aspect in view of security. According to the present disclosure, a procedure is suggested, which allows a non-group member node, which is a node not being member of one of the logical groups, to verify the integrity of the communication system. Herein, the integrity of the communication system should be understood to relate to the consistency of the secret group keys and the legitimacy of the nodes connected to the shared medium. As fill be understood more fully from the description below, the key verification procedure of the present application enables a verification of the integrity of the communication system without knowledge of the secret group keys and system identifiers Referring now to FIG. 2, a flow diagram relating to a key verification procedure according to an embodiment of the present application is schematically illustrated.

A shared medium comprises a plurality of nodes including the exemplary nodes 100.1, 100.2, 100.3 and 100.6. The nodes 100.1, 100.2, 100.3 and 100.6 are enabled to communicate data messages over the shared medium. It should be noted that the shared medium may be a CAN bus referred to with respect to FIG. 1. Those skilled in the art will understand that the described key verification procedure is implementable on any shared medium, which includes in particular any fieldbus.

In the following, the logical groups of nodes connected to the shared medium will be referred to as logical groups LG.1 to LG.M, where M is a non-zero positive integer number. Each of the logical groups LG.1 to LG.M may have assigned an identifier referred to also as logical (group) identifier LID.1 to LID.M. A logical group identifier LID.y may uniquely identify a logical group LG.y, where $1 \leq y \leq M$. Each logical group LG.y has assigned a secret group key $K_{LID}.y$, which is shared only among the nodes being member of the respective logical group LG.y. The nodes connected to the shared medium are provisioned with the one or more secret group key $K_{LID}.y$ according to their respective memberships for instance as exemplified above with reference to FIG. 1.

The key verification procedure is initiated by any initiator node 200, which may by a node temporarily and/or externally connected to the shared medium. For instance, the CAN bus is one of five protocols used in the on-board diagnostics (OBD) II vehicle diagnostics standard. The OBD-II has been mandatory for all cars and light trucks sold in the United States since 1996 and the EOBD standard has been mandatory for all gasoline powered vehicles sold in the European Union since 2001 and all diesel powered vehicles since 2004. The initiator node 200 may be a diagnostic tool, which is temporarily connected to the CAN bus via such an on-board diagnostics interface e.g. for maintenance services. The initiator node 200 is not member of a logical group. Hence, the initiator node 200 has no knowledge about the secret group keys $K_{LID}$ maintained by the nodes connected to the shared medium. The secret group keys $K_{LID}$ are only known/available to the nodes according to their respective group memberships to ensure integrity of the communication based on the use of the secret group keys $K_{LID}$.

In some cases, the node 200 may connect to the shared medium via a network. Examples of such a network include any combination of control area networks (CAN), local area networks (LAN), wide area networks (WAN), virtual private networks (VPN), wireless networks (using 802.11, for example), cloud networks, cellular networks (using 3G and/or LTE, for example), and the like. In some configurations, the network may include the Internet. Thus, the network may include one or more gateway devices, access points, routers, switches, dynamic host configuration protocol (DHCP) servers, and the like, which enable computing devices to connect to the Internet.

The initiator node 200 generates and sends a verification request on the shared medium in an operation S100. The verification request is broadcast to all nodes connected to the shared medium. The nodes receive the verification request and those being member of a logical group are instructed by the verification request to reply with a verification response. The received verification responses enable the initiator node 200 to verify the consistency of the secret group keys $K_{LID}$ provided at the nodes being group members.

The verification request comprises initiator authenticity related information, which enables the receiver nodes to authenticate the initiator node 200. The initiator authenticity related information may comprise a public key and a signature generated by the initiator node 200 using a paired private key. The signature is generated from a predefined sequence including among others a timestamp of the interior node 200.

On receiving the verification request, each node 100.1 to 100.6 is enabled to authenticate the initiator node 200. The authentication verification (e.g. operation S105) includes authentication of the identity of the initiator node 200 and/or the verification of the permission of the initiator node 200 to initiate the verification procedure. In an example, the initiator node 200 identifies itself by an identity certificate and the initiator generated signature comprised by the initiator authenticity related information in the trigger request. The identity certificate of the initiator node 200 may be signed by a certificate authority CA and includes the permission to initiate the key verification procedure.

On successfully authentication of the initiator node 200 by the nodes 100.1 to 100.6, each node broadcasts a verification response on the shared medium back to the initiator node 200, which receives the verification responses and collects code sequences comprised in them. Every node, which is member of at least one logical group, generates a verification response. Every verification response comprises one or more code sequences. Every code sequence of one verification response is based on a different secret group key $K_{LID}$ known to the respective node generating the verification response. A code sequence may be a hash value, a hash code or a digest returned by a hash function. In particular, a cryptographic hash function may be used to generate a code sequence. More particularly, a keyed (cryptographic) hash function or message authentication code (MAC) algorithm may be used to generate the code sequence.

By comparing the code sequences, the initiator node 200 is enabled to verify the integrity of the bus system comprising the shared medium and the nodes connected thereto. A lack of the consistency is assumed in case one of the received code sequences differs from all other received code sequences.

For example, the node 100.1 detects the verification request on the shared medium, which requests the verification of the secret group keys known to the node 100.1. In response to the detected verification request, the node 100.1 generates one or more code sequences based on each secret group key $K_{LID}$ known to the node 100.1. As aforementioned, the nodes only know secret group key $K_{LID}$ in accordance with their group membership. Herein, the node 100.1 is member of the logical group LG 1 and hence the secret group key $K_{LID}.1$ is available at the node 100.1. The node 100.1 is configured to generate a code sequence based on the secret group key $K_{LID}.1$. A cryptographic hash function based on the secret group key $K_{LID}$ and may be used to generate the code sequence $MAC.K_{LID}.1$ or $MAC.1$ from a predetermined data sequence. In particular, the code sequence is a message authentication code (MAC), which is generated from a predetermined data sequence using the secret group key $K_{LID}.1$ in an operation S110. The node 100.1 then generates a verification response, which includes the generated code sequence $MAC.K_{LID}.1$ and broadcasts the verification response on the shared medium for reception by the initiator node 200 in an operation S120.

Further for example, the node 100.2 detects the verification request on the shared medium, which requests the verification of the secret group keys known to the node 100.2. In response to the detected verification request, the node 100.2 generates one or more code sequences based on each secret group key $K_{LID}$ known to the node 100.2. Herein, the node 100.2 is member of the logical groups LG 1, LG 2 and LG 3. Hence, the secret group keys $K_{LID}.1$, $K_{LID}.2$ and $K_{LID}.3$ are available at the node 100.2, which is configured to generate one code sequence, one message authentication code, based on each of the secret group keys $K_{LID}.1$, $K_{LID}.2$ and $K_{LID}.3$ for a predefined data sequence in an operation S130. The node 100.2 then generates a verification response, which includes the generated code sequences MAC.K$_{LID}$.1, MAC.K$_{LID}$.2 and MAC.K$_{LID}$.3 and broadcasts the verification response on the shared medium for reception by the initiator node 200 in an operation S140.

Further for example, the node 100.3 detects the verification request on the shared medium, which requests the verification of the secret group keys known to the node 100.3. In response to the detected verification request, the node 100.3 generates one or more code sequences based on each secret group key K$_{LID}$ known to the node 100.3. Herein, the node 100.3 is member of the logical groups LG 2 and LG 3. Hence, the secret group keys K$_{LID}$.2 and K$_{LID}$.3 are available at the node 100.3, which is configured to generate one code sequence, one message authentication code, based on each of the secret group keys K$_{LID}$.2 and K$_{LID}$.3 for a predefined data sequence in an operation S150. The node 100.3 then generates a verification response, which includes the generated code sequences MAC.K$_{LID}$.2 and MAC.K$_{LID}$.3 and broadcasts the verification response on the shared medium for reception by the initiator node 200 in an operation S160.

Further for example, the node 100.6 detects the verification request on the shared medium, which requests the verification of the secret group keys known to the node 100.6. In response to the detected verification request, the node 100.6 generates one or more code sequences based on each secret group key K$_{LID}$ known to the node 100.6. Herein, the node 100.6 is member of the logical groups LG 4. Hence, the secret group key K$_{LID}$.4 is available at the node 100.6, which is configured to generate one code sequence, one message authentication code, based on the secret group key K$_{LID}$.4 for a predefined data sequence in an operation S170. The node 100.4 then generates a verification response, which includes the generated code sequence MAC.K$_{LID}$.4 and broadcasts the verification response on the shared medium for reception by the initiator node 200 in an operation S180.

The nodes 100.1 to 100.6 use the same data sequence as a basis to generate the code sequences. Provided that the same secret group key K$_{LID}$.X is used by different nodes to generate code sequences MAC.K$_{LID}$.x, the code sequences MAC.K$_{LID}$.x received by the initiator node 200 in the verification responses should correspond to each other. For instance, the nodes 100.1 and 100.2, which are member of the logical group LG 1, each generate the code sequence MAC.K$_{LID}$.1 using the secret group key K$_{LID}$.1 and each broadcast the generated code sequence MAC.K$_{LID}$.1 to the initiator node 200. The initiator node 200 is configured to compare the code sequence MAC.K$_{LID}$.1 received from the node 100.1 and the code sequence MAC.K$_{LID}$.1 received from the node 100.2. In case the comparison indicates that the received code sequences MAC.K$_{LID}$.1 correspond to each other, the conclusion can be drawn that the nodes 100.1 and 100.2 have available to same secret group key K$_{LID}$.1.

The initiator node 200 collects all code sequences MAC.K$_{LID}$ received from the nodes connected to the shared medium. In case all received code sequences MAC.K$_{LID}$ correspond to at least one other, it is assumed that the consistency of the secret group keys and the integrity of the system is confirmed/attested. In case one code sequence MAC.K$_{LID}$ differs from all other ones, it is assumed that the consistency of the system is incomplete because of at least one node. The integrity of the system is inconsistent because of the incomplete consistency of the secret group keys K$_{LID}$ at the plurality of connected nodes 100.1 to 100.6. A differing code sequence MAC.K$_{LID}$ means that the node, which has generated the differing code sequence MAC.K$_{LID}$, has available a differing (wrong) secret group key K$_{LID}$ and/or a differing predetermined data sequence. A differing (wrong) secret group key K$_{LID}$ and/or a differing predetermined data sequence renders the node unfunctional for the purpose of the usage of shared secret keys.

In an example, the verification responses generated by the nodes comprise one or more code sequences (such as message authentication codes) and information about the logical groups, the secret group keys of which have been applied to generate the one or more code sequence. The initiator node 200 is hence enabled to group each received code sequence MAC.K$_{LID}$.x with the respective logical group LG x.

Figure 3A:
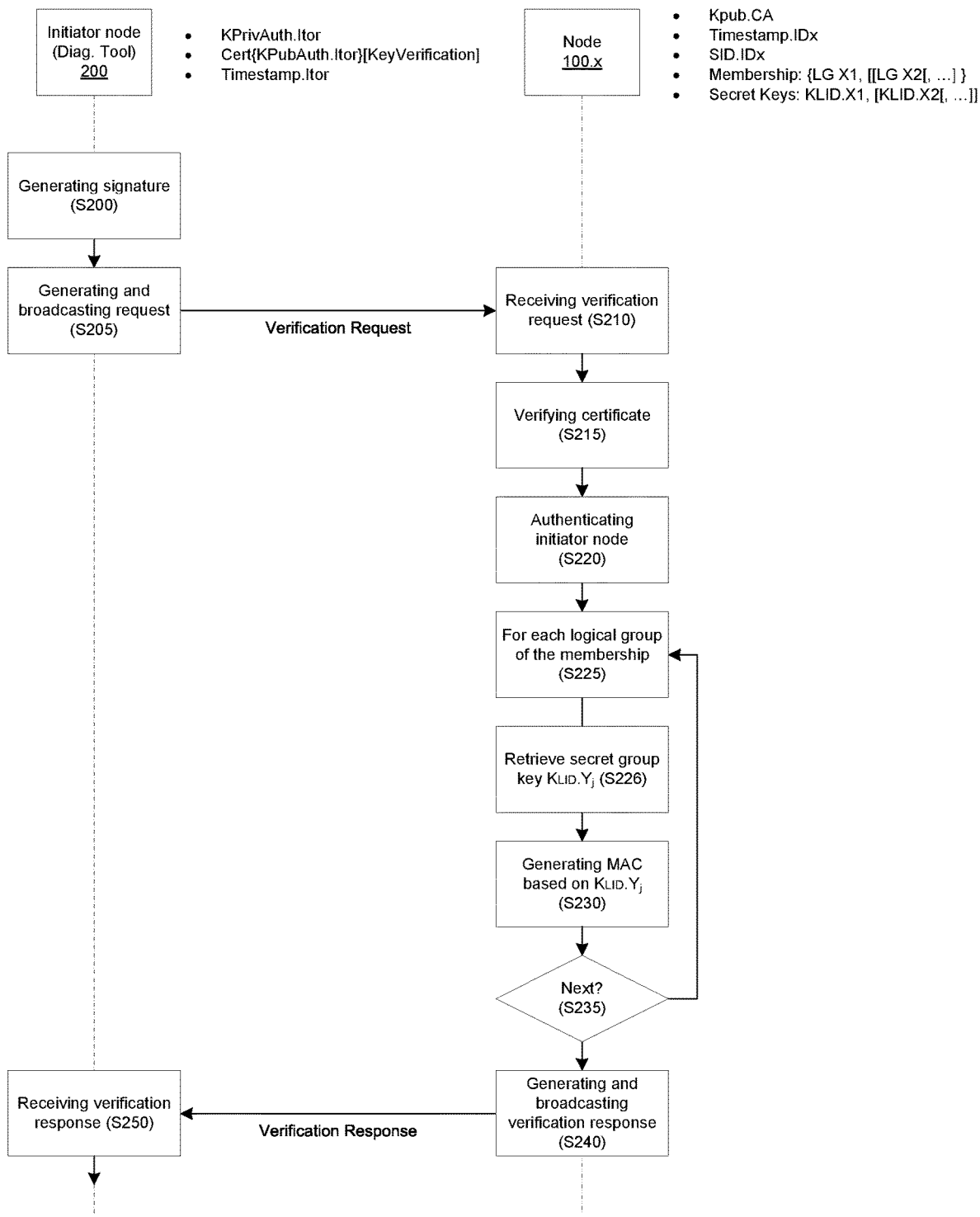
FIGS. 3a and 3b schematically illustrate flow diagrams of operations carried out by networked nodes according to examples of the present invention.
Figure 3B:
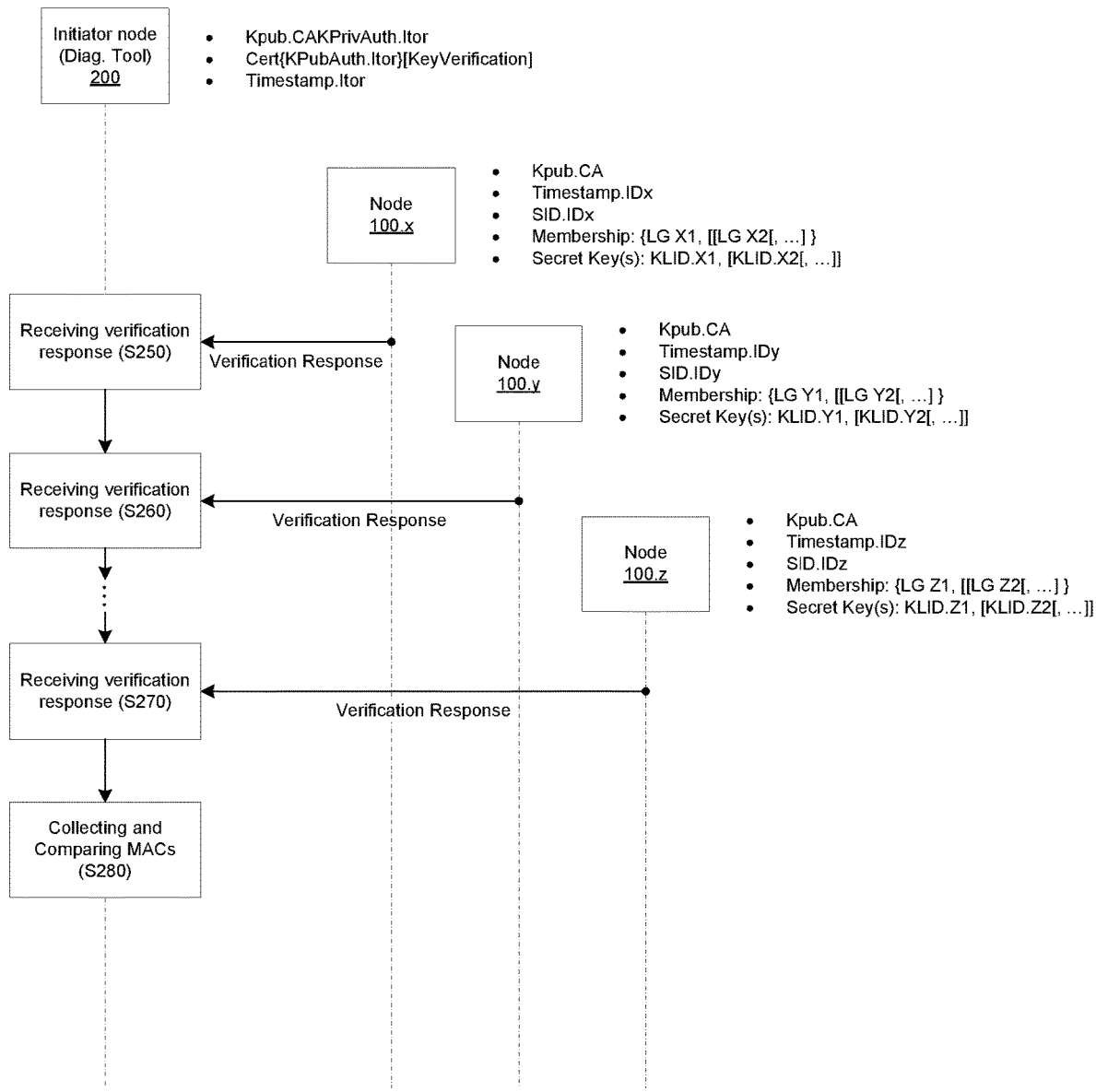

The aforementioned verification process will be described in the following more fully with respect to FIGS. 3a and 3b, which schematically illustrate flow diagrams of operations carried out by the aforementioned nodes according to examples of the present application.

For enabling the authentication and permission verification of the initiator node 200 by the nodes such as one of the nodes 100.1 to 100.6, the verification request includes the initiator authenticity related information, which comprises for instance a signature Si, which is generated in an operation S200 at the initiator node 200, and an identity certificate Cert{KPubAuth.Itor} [KeyVerification] signed by a certification authority, CA. The identity certificate Cert{KPubAuth.Itor} [KeyVerification] includes a public key KPubAuth.Itor assigned to initiator node 200 and may further comprise a usage definition, for instance for initiating the key verification procedure.

The signature Si generated by the initiator node 200 is obtained by signing a predefined sequence using a private authentication key KPrivAuth.Itor. The public key KPubAuth.Itor and the private authentication key KPrivAuth.Itor from a public-private key pair.

The predefined sequence may be formed of one or more sub-sequences. One of the sub-sequences may comprise a sequence with variable content, in particular a time-dependent variable content sequence such as a timestamp sequence Timestamp.Itor provided by the initiator node 200. It should be noted that a timestamp sequence represents a particular variable content sequence with a monotonic increasing content value. The sub-sequences include for instance an instruction/trigger sequence "KeyVerification-Request". The sub-sequences may further comprise a distinction sequence "0x00" (hexadecimal coded zero).

The signature is generated from a concatenation of one or more of the aforementioned sub-sequences; for instance, the predefined sequence may be formed as following:

0x00 ∥ KeyVerificationRequest [∥ Timestamp.Itor]

where ∥ should be understood as a concatenation operator.

The signature Si is generated on the basis of a private key referred to as the private authentication key KPrivAuth.Itor available only to the initiator node 200:

Si←sign{KPrivAuth.Itor} (0x00 ∥ KeyVerificationRequest [∥ Timestamp.Itor])

The verification request comprises the signature Si and the identity certificate Cert{KPubAuth.Itor} [KeyVerification] of the initiator node 200. The verification request further comprises the variable content sequence such as the timestamp Timestamp.Itor. For instance:

Verification_Request(Timestamp.Itor, Si, Cert{KPubAuth.Itor} [KeyVerification])

where Timestamp.Itor denotes the timestamp provided at the initiator node 200; Si denotes the generated signature and Cert{KPubAuth.Itor} [KeyVerification] refers to the identity certificate provided at the node 200.

The verification request generated at the initiator node 200 is broadcast on the shared medium, for instance to nodes 100.1 to 100.6, in an operation S205. On receiving the verification request in an operation S210, the node 100.*x*, which is for instance one of the nodes 100.1 to 100.6, may first verify the identity and permission of the initiator node 200 in order to prevent from unauthorized access.

In an operation S215, the validity of the identity certificate Cert{KPubAuth.Itor} [KeyVerification] is verified by the node 100.*x* using the public CA key KPub.CA of the certificate issuing authority CA:

Verify{KPub.CA} (Cert{KPubAuth.Itor} [KeyVerification])

The public CA key KPub.CA is available to the node 100.*x*. In an example, the public CA key KPub.CA is provisioned at the node 100.*x*. For instance, the public CA key KPub.CA is preconfigured at the node 100.*x*.

In case the identity certificate Cert{KPubAuth.Itor} [KeyVerification] is successfully verified, the authenticity of the initiator node 200 is further verified based on the signature Si comprised in the verification request an operation S220:

Verify{KPubAuth.Itor} (Si, 0x00 ∥ KeyVerificationRequest [∥ Timestamp.Itor])

In case the authentication verification is successful, it is ensured that the received trigger request has been generated by the initiator node 200 being in possession of the private authentication key of the KPrivAuth.Itor.

In a further operation S220, the timestamp sequence Timestamp.Itor, which may be comprised in the trigger request, can be compared to a local timestamp Timestamp.IDx of the node 100.*x*; herein IDx refers to the node 100.*x*. In case the timestamp sequence Timestamp.Itor is older (smaller) than the local timestamp Timestamp.IDx of the node 100.*x*, the procedure may be aborted:

If Timestamp.Itor<Timestamp.IDx then Abort( ).

Otherwise, in case the timestamp Timestamp.Itor of the initiator node 200 is accepted, the local timestamp Timestamp.IDx of the node 100.*x* may be updated with the timestamp Timestamp.Itor of the initiator node 200:

Timestamp.IDx←Timestamp.Itor.

In an example, the aforementioned timestamp sequence may comprise a monotonic counter values, which may change in response to predefined events. For instance, at the time the vehicle is manufactured, the counter may be initialized to value 0 and increased in response to predefined events over the live time of the vehicle. In another example, the aforementioned timestamp may be comprise a time span value in predefined unit(s) determined from a reference time/date and the current time/date.

A code sequence is generated for each logical group LG, of which the node 100.*x* is member. Herein node 100.*x* is member of one or more logical groups LG $X_1$, ..., LG $X_{IDx}$. The one or more secret group keys $K_{LID}.X_1$, ..., $K_{LID}.X_{IDx}$ associated with the logical groups LG $X_1$, ..., LG $X_{IDx}$, of which the node 100.*x* is member, are retrieved for instance from a secure key storage and provided for generating one or more code sequences based thereon from a predetermined data sequence in an operation S230.

The predefined data sequence may be formed of one or more data sub-sequences. One of the data sub-sequences may comprise a sequence with variable content, in particular a time-dependent variable content sequence such as a timestamp sequence Timestamp.Itor received in the verification request from the initiator node 200. The data sub-sequences may further comprise a distinction sequence "0xFFFFFFFF" (hexadecimal coded $2^{32}-1$). The data sub-sequences may further comprise a system identifier SID.IDx; herein IDx refers to the node 100.*x*. The system identifier SID.IDx is available to the node 100.*x*. In an example, the system identifier SID.IDx is provisioned at the node 100.*x*. For instance, the system identifier SID.IDx is preconfigured at the node 100.*x*.

The predefined data sequence is formed of a concatenation of one or more of the aforementioned data sub-sequences; for instance, the predefined data sequence may be formed as following:

[0xFFFFFFFF∥] Timestamp.Itor [∥ SID.IDx].

The one or more code sequences are the result of a keyed hash function (or message authentication function) MAC using the one or more retrieved secret group keys $K_{LID}.X_1$, $K_{LID}.X_{IDx}$ and applied on the predefined data sequence. For instance:

MAC.$K_{LID}.X_j$←MAC($K_{LID}.X_j$, [0xFFFFFFFF∥] Timestamp.Itor [∥ SID.IDx]), where $X_j=\{X_1, \ldots, X_{IDx}\}$ defines the group membership of the node 100.*x*.

Figure 2:
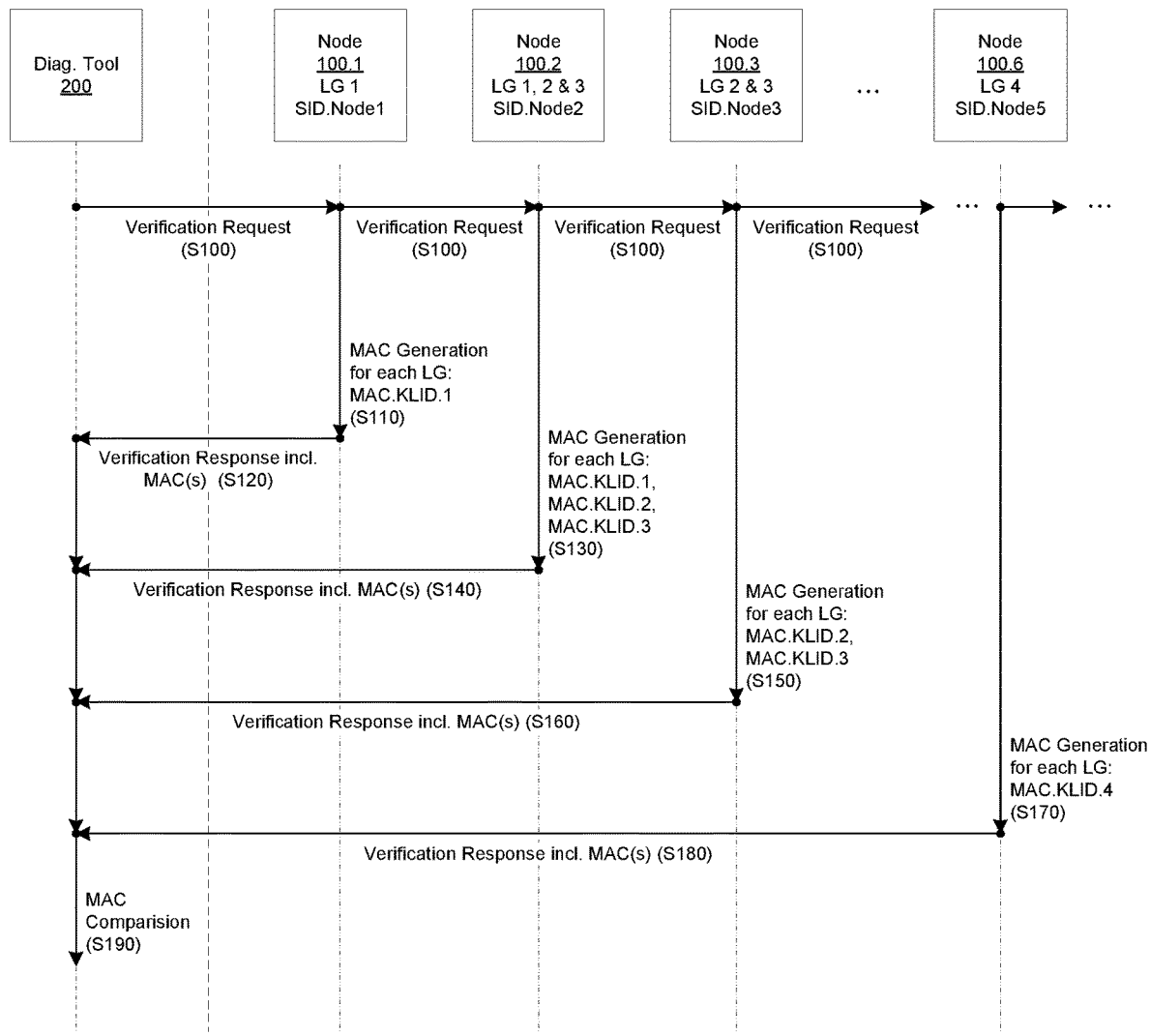
FIG. 2 schematically illustrates a flow diagram relating to a verification procedure of shared secret keys known to nodes connected to a shared medium of a network according to an example of the present invention.

Referring back to the example shown in FIG. 2, the node 100.1 generates the code sequence MAC.$K_{LID}$.1 according to its membership of logical group 1, the node 100.2 generates the code sequences MAC.$K_{LID}$.1, MAC.$K_{LID}$.2 and MAC.$K_{LID}$.3 according to its membership of logical groups LG 1, LG 2 and LG 3, the node 100.3 generates the code sequences MAC.$K_{LID}$.2 and MAC.$K_{LID}$.3 according to its membership of logical groups LG 2 and LG 3, and the node 100.6 generates the code sequence MAC.$K_{LID}$.4 according to its membership of logical group LG 4.

Once all the code sequences in accordance with the group membership of the node 100.*x* are generated, a verification response is generated including the generated code sequence and broadcast on the shared medium for being received by the initiator node 200 in an operation S240:

Verification_Response(MAC.$K_{LID}.X_1$, [MAC.$K_{LID}.X_2$, [MAC.$K_{LID}.X_3$, [ . . . ]]])

In accordance with the example of FIG. 2, the verification response generated by the node 100.1 includes the code sequence MAC.$K_{LID}$.1 generated by using the secret group key $K_{LID}$.1 associated with the logical group LG 1, of which the node 100.1 is member, the verification response generated by the node 100.2 includes the code sequences MAC.$K_{LID}$.1, MAC.$K_{LID}$.2 and MAC.$K_{LID}$.3 generated by using the secret group keys $K_{LID}$.1, $K_{LID}$.2 and $K_{LID}$.3 associated with the logical groups LG 1, LG 2 and LG 3, of which the node 100.2 is member, the verification response generated by the node 100.3 includes the code sequences MAC.$K_{LID}$.2 and MAC.$K_{LID}$.3 generated by using the secret group keys $K_{LID}$.2 and $K_{LID}$.3 associated with the logical groups LG 2 and LG 3, of which the node 100.3 is member, and the verification response generated by the node 100.6 includes the code sequence MAC.$K_{LID}$.4 generated by using the secret group key $K_{LID}$.4 associated with the logical group LG 4, of which the node 100.6 is member.

In operations S250, the initiator node 200 detects the verification response broadcast by the node 100.*x* on the shared medium and extracts the one or more code sequences included in the verification response.

In one or more further operations, the initiator node 200 detects one or more further verification responses broadcast by the nodes on the shared medium such as nodes 100.*y* and 100.*z*, which should be understood to represent for instance the nodes 100.1 to 100.6, in exemplary operations S250 to S270. Each of the verification responses comprises code sequences in accordance with the group membership of the respective broadcasting node as exemplified above.

The code sequences of the received verification responses are collected at the initiator node 200. The initiator node 200 may accept verification responses for a predefined period of time for instance by using a timeout counter, during which verification responses are expected to be received. The initiator node 200 may count the number of detected verification responses and compare the number of detected verification responses to a predefined expected number in order to ensure that verification responses are received from all nodes being member of one or more logical groups.

In an operation S280, the collected code sequences are compared with each other. In case of a system with integrity, it is expected that at least two code sequences of the collected code sequences correspond to each other. In case one code sequence mismatch with all other collected code sequences, the integrity of the system is considered as inconsistent.

In an example, the verification response generated by the node 100.*x* (or 100.*y* or 100.*z*) may further comprise a logical group identifier $LID.X_j$ for each code sequence $MAC.K_{LID}.X_j$, which allows to associate each code sequence $MAC.K_{LID}.X$, with the respective logical group X. For instance:

Verification_Response($MAC.K_{LID}.X_1$, [$MAC.K_{LID}.X_2$ [, $MAC.K_{LID}.X_3$ [, . . . ]]]; $LID.X_1$ [, $LID.X_2$ [, $LID.X_3$ [, . . . ]]])

The logical group identifiers $LID.X_j$ allow to sort the collected code sequences based thereon. The code sequences of each logical group are compared with each other. In a system with integrity, it is expected that code sequences of a logical group correspond to each other. In case the code sequences of a logical group mismatch, the integrity of the system is considered as compromised.

Those skilled in the art understand from the above description that the explained key verification procedure enables to verify the integrity of the system with respect to the consistency of the secret group keys without requiring a communication of the secret group keys over the shared medium or without knowledge of the secret group keys by the initiator node 200, which verifies the system integrity.

As already aforementioned, the nodes, which are members of one or more groups, may be provisioned with a system identifier SID. Such a system identifier may be unique for the bus system, which comprises the nodes connected to the shared medium. Such a system identifier may be unique for the device comprising the bus system. The system identifier SID may a system identification number. With reference to the aforementioned vehicle CAN bus example, the system identifier SID may be the vehicle identification number VIN, which uniquely identifies a vehicle, in which the CAN bus is built. The system identifier SID allows to legitimate the use of nodes in the bus system.

In an example, each of the nodes are provisioned with the system identifier SID to ensure that only nodes intended for the system/device/vehicle are legitimately connected to the shared medium. In particular, provisioning the nodes with a unique system identifier SID allows to detect an illegitimate node such as a stolen node or counterfeit node. The system identifier SID may be preconfigured at the nodes. For instance, the system identifier SID may be part of a firmware a configuration storage, which may be protected against modification. The system identifier SID may be configurable using a secure methodology.

The predefined data sequence is formed of one or more data sub-sequences, which comprise the system identifier SID.IDx; provisioned at the node 100.*x*. The one or more code sequences are the result of a keyed hash function (or message authentication function) MAC using the one or more retrieved secret group keys $K_{LID}.X_1$, $K_{LID}.X_{IDx}$ and applied on the predefined data sequence. For instance:

$MAC.K_{LID}.X_j \leftarrow MAC(K_{LID}.X_j,$ [0xFFFFFFFF|| Timestamp.Itor|| SID.IDx), where $X_j = \{X_1, \ldots, X_{IDx}\}$ defines the group membership of the node 100.*x*.

Hence, the comparison of the collected code sequences at the initiator node 200 indicates a mismatch in case a secret group key Klid.x and/or the system identifier SID.IDx at one of the nodes mismatches with the secret group key(s) Klid.x at one or more other nodes.

Hence, the comparison allows to confirm/attest the integrity of the system with respect to the consistency of the secret group keys $K_{LID}$ and the consistency of the system identifiers SID provided at the nodes of the system.

Figure 4A:
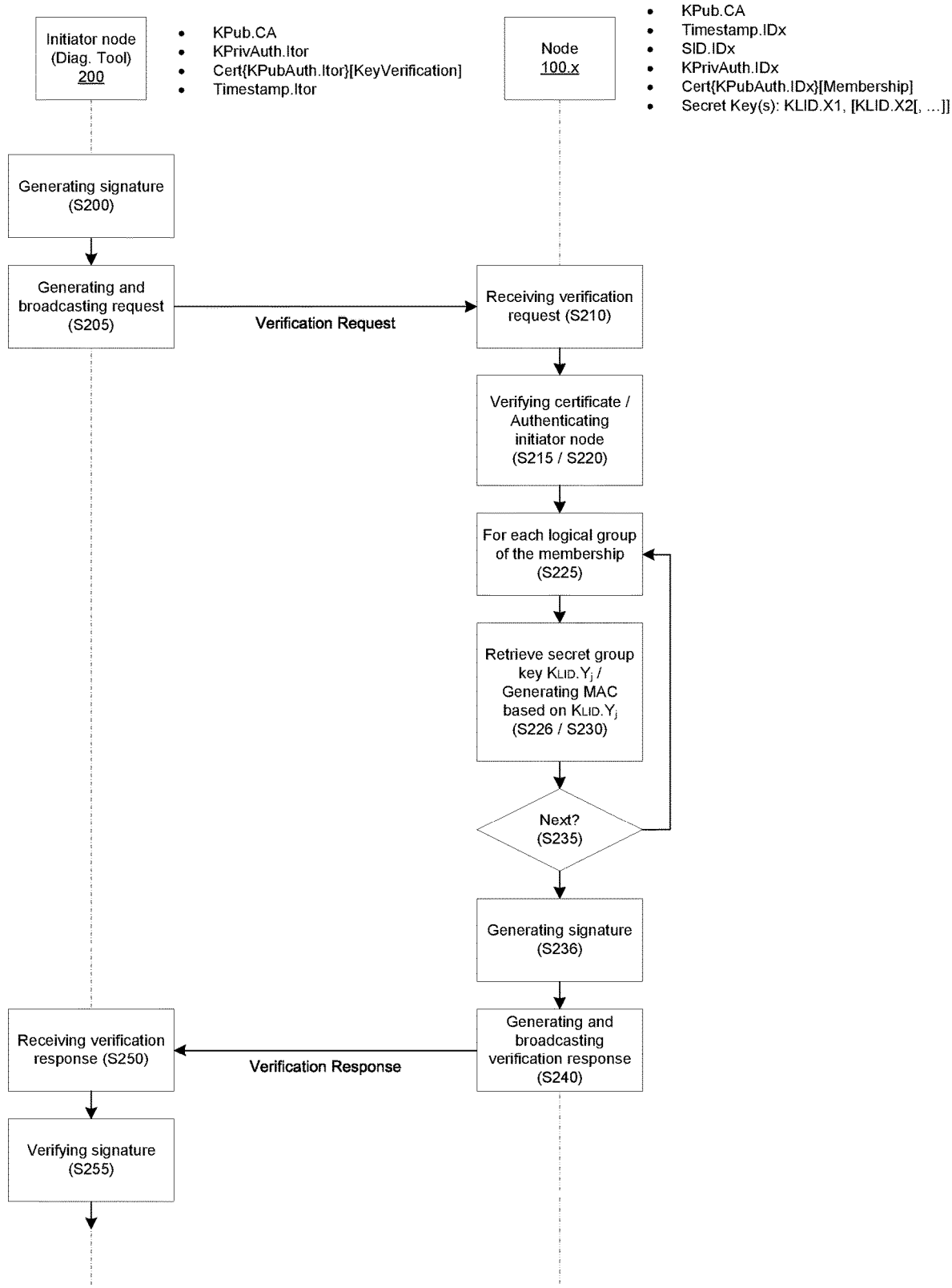
FIGS. 4a and 4b schematically illustrate flow diagrams of operations carried out by networked nodes according to another examples of the present invention.
Figure 4B:
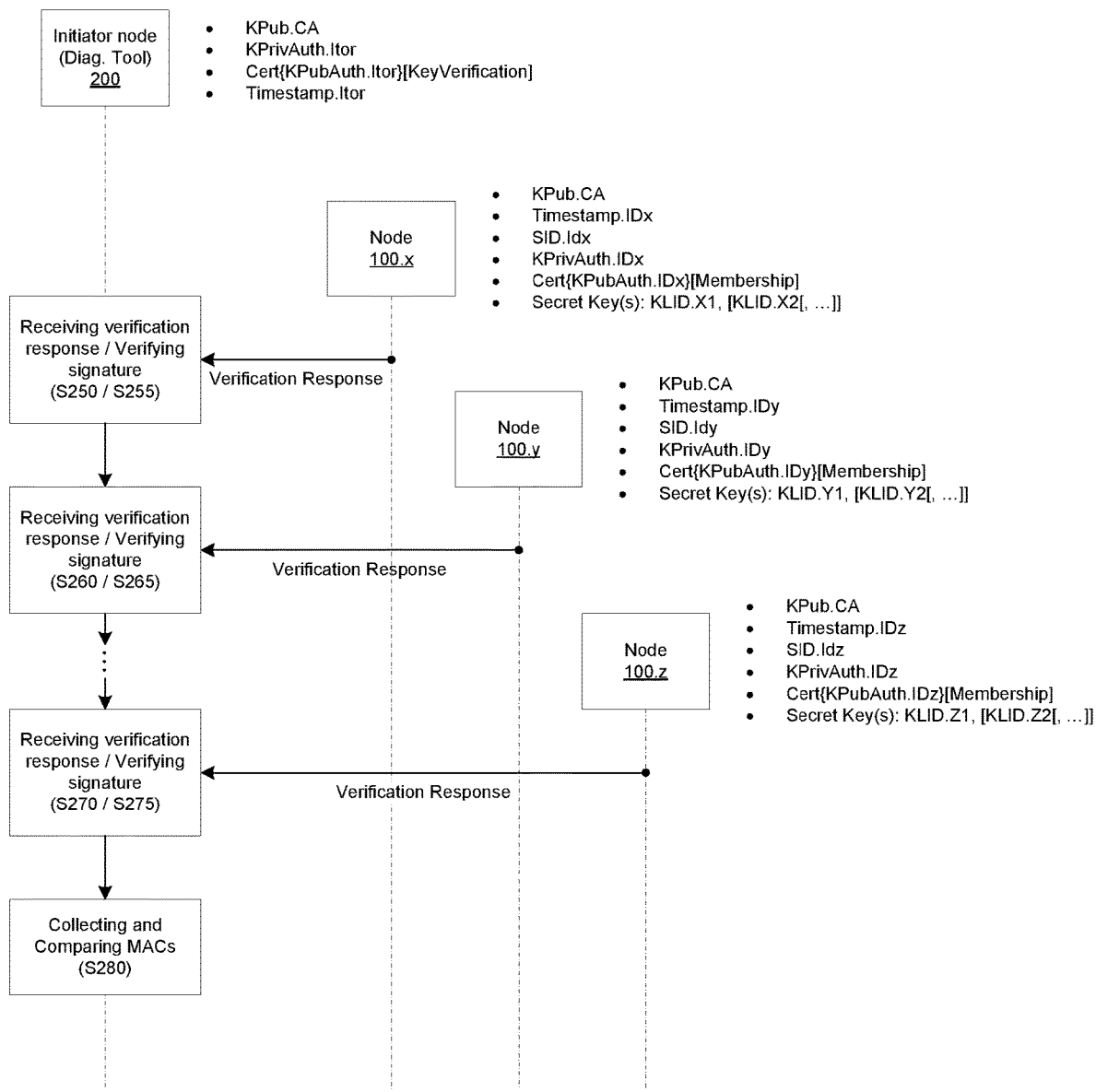

The aforementioned verification process will be further described in the following with respect to FIGS. 4*a* and 4*b*, which schematically illustrate flow diagrams of operations carried out by the aforementioned nodes according to another examples of the present application.

For the sake of omitting unnecessary repetition, in the following only operations, which are performed in addition to those described above with reference to FIGS. 4*a* and 4*b* will be described. In particular, the description referring to operations S200 to S235 of FIG. 3*a* applies to the verification process illustrated in FIG. 4*a*, likewise.

In operations S225 to 235, the code sequences in accordance with the group membership of the node 100.*x* are generated. In order to allow for authenticating the verification response comprising the code sequences by the initiator node 200, the node 100.*x* is further configured to generate a node authenticity related information. The node authenticity related information may be based on signature Sa, which is generated by signing a predefined signature sequence using a private authentication key KPrivAuth.IDx of the node 100.*x*. The predefined signature sequence may be formed of one or more sub-sequences. One of the sub-sequences may comprise a sequence with variable content, in particular a time-dependent variable content sequence such as a timestamp sequence Timestamp.IDx provided by the node 100.*x* or Timestamp.Itor received by the node 100.*x* as part of the verification request from the initiator node 200. In an example, the sub-sequences may further comprise the group identifiers LIDs of the groups, of which the node 100.*x* is member:

Sa←Sign{KPrivAuth.IDx} (Timestamp.IDx|| {$LID.X_1, \ldots, LID.X_{IDx}$})

where $LID.X_1, \ldots, LID.X_{IDx}$ defines the set of logical group identifiers in accordance with the group membership of the node 100.*x*.

A verification response is generated including the generated code sequence and the signature for being broadcast on the shared medium to the initiator node 200 in an operation S240:

Verification_Response(Sa, Cert{KPubAuth.IDx} [Membership], $MAC.K_{LID}.X_1$, [$MAC.K_{LID}.X_2$, [$MAC.K_{LID}.X_3$, [ . . . ]]])

The identity certificate Cert{KPubAuth.IDx} [Membership] of the node 100.*x* is signed by the certification authority CA. The identity certificate Cert{KPubAuth.IDx} [Membership] comprise the membership definition of node 100.*x*. The membership defines, of which logical groups the node 100.*x* is member. The identity certificate Cert{KPubAuth.IDx} [Membership] and the private authentication key KPrivAuth.IDx (corresponding to the public authentication key KPubAuth.IDx comprised in the identity certificate of node 100.x) are available to the receiver node 100.x. In an example, the identity certificate Cert{KPubAuth.IDx} [Membership] and the private authentication key KPubAuth.IDx are provisioned at the node 100.x. For instance, they are preconfigured at the receiver node 100.x.

In the operation S250, the verification response is received by the initiator node 200. In an operation S255, the response is first verified for authentication by the initiator node 200. First, the identity certificate Cert{KPubAuth.IDx} [Membership] relating to the node 100.x is verified using the public CA key KPub.CA:

Verify{KPub.CA} (Cert{KPubAuth.IDx} [Membership])

The public CA key KPub.CA is available to the initiator node 200. In an example, the public CA key KPub.CA is provisioned at the initiator node 200. For instance, the public CA key KPub.CA is preconfigured at the initiator node 200.

In case the identity certificate is successfully verified, the signature is verified by using the public authorization key KPubAuth.IDx comprised in the identity certificate Cert{KPubAuth.IDx} [Membership] of the node 100.x:

Verify{KPubAuth.IDx} (Sa, Timestamp.Itor|| {LID.X$_1$, ..., LID.X$_{IDx}$})

wherein LID.X$_1$, ..., LID.X$_{IDx}$ defining the set of logical group identifiers in accordance with the group membership of the node 100.x, are part of the identity certificate Cert{KPubAuth.IDx} [Membership] and may be extracted therefrom. In case the authentication verification is successful, it is ensured that the verification response has been generated by the node 100.x being in possession of the private authentication key of the KPrivAuth.IDx. The procedure may be aborted in case of a unsuccessful authentication.

In one or more further operations, the initiator node 200 detects one or more further verification responses broadcast by the nodes on the shared medium such as nodes 100.y and 100.z, which should be understood to represent for instance the nodes 100.1 to 100.6, in exemplary operations S250 to S270. Each of the verification responses is verified before the code sequences comprised in the verification responses are extracted therefrom for comparison in an operation S280. Each verification response comprises information about the membership of the verification response broadcasting nodes 100.x to 100.z. Based on information about the membership, each of the code sequences extracted from the verification responses can be associated with a respective logical group. In the comparison operation S280, the code sequences associated with a respective one of the logical groups are compared with each other. The comparison is successful in case all code sequences associated with a respective one of the logical groups match each other or equal each other.

Those skilled in the art immediately understand from the above description of the present application that the initiator node is enabled to confirm/attest the integrity of the system. The confirming of the system integrity includes confirming of the consistency of the secret group keys provided at the nodes without that the initiator node 200 acquires knowledge about the secret group keys K$_{LID}$, which contributes to the confidentiality requirement of the secret group keys. The confirming of the system integrity may further include confirming of the consistency of the system identifiers SID provided at every node 100.x to 100.z or 100.1 to 100.6.

Figure 5:
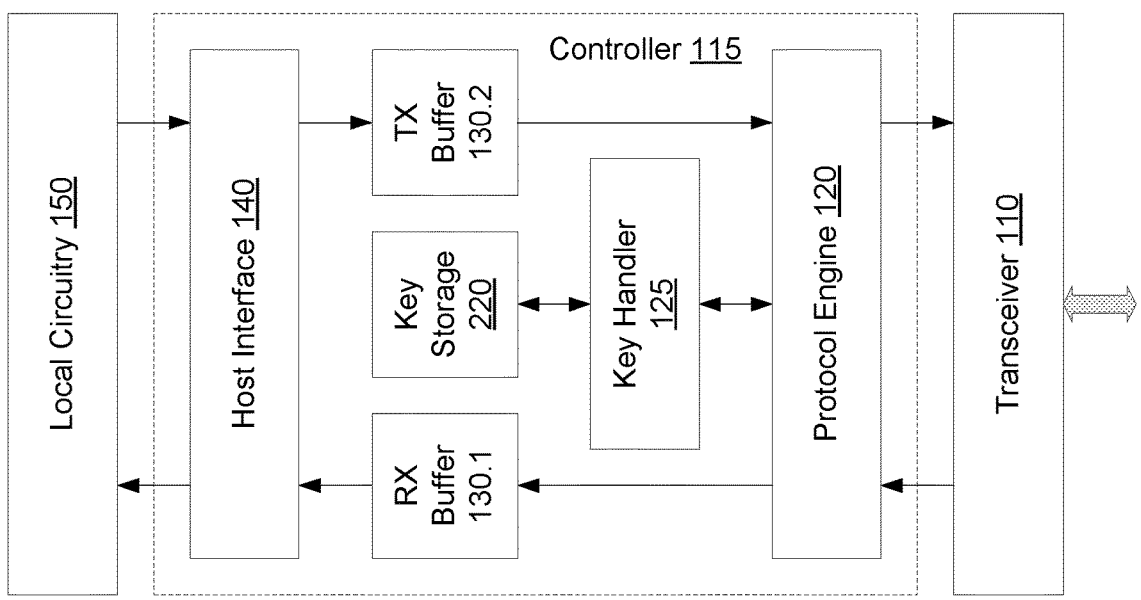
FIG. 5 schematically illustrates a block diagram of a node connected to a shared medium according to an embodiment of the present application.

Referring now to FIG. 5, a block diagram of a node according to an example of the present application is schematically illustrated. The node comprises for instance a bus controller, which is connected between a local circuitry 150 of the node and a transceiver 110, which connects to the shared medium of a distributed network such as a CAN bus or any other fieldbus. The local circuitry 150 may comprise a microprocessor. The network controller 115 comprises a protocol engine 120, RX and TX buffers 130.1, 130.2 and the host interface 140.

The protocol engine 120 may comprises a finite state machine, which is arranged to sequence through frames on a bit-by-bit basis, and change state for the various frame formats that are broadcasting or receiving. In particular, the protocol engine 120 is arranged to control the bit stream between transmit path and receive path in order to ensure that broadcasting, reception, arbitration, and error signaling are performed according to a network protocol.

Message data to be broadcast over the shared medium is loaded into the transmit TX buffer 130.2 via the host interface 140 by the local circuitry 150 of the node. The transmit TX buffer 130.2 may comprise several TX buffers for message data with different priorities levels. For instance, the transmit TX buffer 130.2 may comprise a primary transmit TX buffer for message date with high priority and a secondary transmit buffer for message data with low priority. The protocol engine 120 is for instance configured to compose a frame of prescribed format comprising the message data buffered in the transmit TX buffer 130.2 and to output the composed frame onto the shared medium via the transceiver 110. The protocol engine 120 is for instance arranged to output the composed message frame in a serial stream of logic signals to the transceiver 110.

Similarly, the protocol engine 120 is arranged to receive frames in form of a serial streams of logic signals via the transceiver 110 interfacing with the shared medium and is further arranged to decompose the received frames according to the frame formats. The data of a received frame provided to a receive RX buffer 130.1, from which it can be retrieved.

A key handler 125 is for instance connected to the protocol engine 120 and a local key storage 220. The key handler 125 is configured to perform the operation described above with reference to FIGS. 2, 3a and 3b of a node being member of a logical group. In particular, the key handler 125 is configured to perform the generating of the code sequence based on a hash function such as a keyed cryptographic hash function or a message authentication code algorithm.

Figure 6:
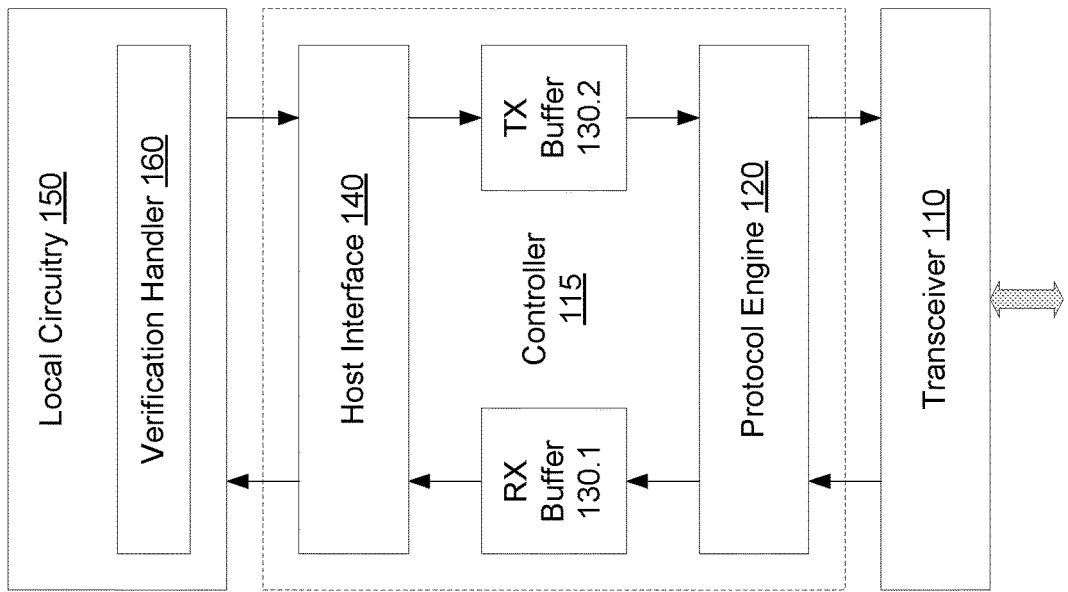
FIG. 6 schematically illustrates a block diagram of an initiator node according to an embodiment of the present application.

Referring now to FIG. 6, a block diagram of an initiator node according to an example of the present application is schematically illustrated. The initiator node comprises for instance a bus controller, which is connected between a local circuitry 150 of the node and a transceiver 110, which connects to the shared medium of a distributed network such as a CAN bus or any other fieldbus. The local circuitry 150 may comprise a microprocessor. The network controller 115 comprises a protocol engine 120, RX and TX buffers 130.1, 130.2 and the host interface 140.

The protocol engine 120 may comprises a finite state machine, which is arranged to sequence through frames on a bit-by-bit basis, and change state for the various frame formats that are broadcasting or receiving. In particular, the protocol engine 120 is arranged to control the bit stream between transmit path and receive path in order to ensure that broadcasting, reception, arbitration, and error signaling are performed according to a network protocol.

Message data to be broadcast over the shared medium is loaded into the transmit TX buffer 130.2 via the host interface 140 by the local circuitry 150 of the node. The transmit TX buffer 130.2 may comprise several TX buffers for message data with different priorities levels. For instance, the transmit TX buffer 130.2 may comprise a primary transmit TX buffer for message date with high priority and a secondary transmit buffer for message data with low priority. The protocol engine 120 is for instance configured to compose a frame of prescribed format comprising the message data buffered in the transmit TX buffer 130.2 and to output the composed frame onto the shared medium via the transceiver 110. The protocol engine 120 is for instance arranged to output the composed message frame in a serial stream of logic signals to the transceiver 110.

Similarly, the protocol engine 120 is arranged to receive frames in form of a serial streams of logic signals via the transceiver 110 interfacing with the shared medium and is further arranged to decompose the received frames according to the frame formats. The data of a received frame provided to a receive RX buffer 130.1, from which it can be retrieved.

A verification handler 160 is for instance provided as part of the local circuitry 150. The verification handler 160 is configured to perform the operation described above with reference to FIGS. 2, 3a and 3b of an initiator node. In particular, the verification handler 160 is configured to perform the collecting and comparing of the code sequences received in the verification responses to determine whether or not the integrity of the system is compromised.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of verifying secret keys in a distributed network, wherein the network comprises a plurality of nodes connected to a shared medium of the distributed network, wherein each node of the plurality of nodes is member of at least one group of a plurality of groups, wherein each group is associated with a secret group key, wherein each node of the plurality of nodes is provided with only the one or more secret group keys, of which it is member, said method comprising:
broadcasting a verification request on the shared medium to be received by the plurality of nodes;

receiving verification responses broadcast from the plurality of nodes on the shared medium, wherein each verification response is broadcast by one of the plurality of nodes, wherein each verification response comprises one code sequence for each logical group, of which the broadcasting node is member, wherein each code sequence of the verification request is generated on the basis of a secret group key associated with a respective logical group from a predefined data sequence, collecting the code sequences comprised in the received verification responses; and confirming integrity of the plurality of nodes by comparing the code sequences.

2. The method according to claim 1, wherein the verification request is sent by an initiator node, wherein the verification request is an authenticated verification request, which comprises initiator authenticity related information, wherein the initiator authenticity related information enables the plurality of nodes to perform an authentication verification based on the initiator authenticity related information.

3. The method according to claim 1, wherein the verification request further comprises node authenticity related information, which enables the initiator node to perform an authentication verification based on the node authenticity related information.

4. A method of verifying secret keys in a distributed network, wherein the network comprises a plurality of nodes connected to a shared medium of the distributed network, wherein each node of the plurality of nodes is member of at least one group of a plurality of groups, wherein each group is associated with a secret group key, wherein each node of the plurality of nodes is provided with only the one or more secret group keys, of which it is member, said method comprising:

receiving a verification request broadcast on the shared medium by an initiator node to be received by a node of the plurality of nodes;

generating a code sequence on the basis of each secret group key associated with a respective one of the one or more logical groups, of which the receiving node is member, from a predefined data sequence generating a verification response comprising one code sequence for each of the one or more logical groups, of which the receiving node is member, broadcasting the verification response on the shared medium to be received by the initiator node, wherein the initiator node configured to collect the code sequences comprised in verification responses received from the plurality of nodes and to confirm integrity of the plurality of nodes by comparing the code sequences.

5. The method according to claim 4, wherein the predefined data sequence is formed of one or more sub-sequences, which comprises a sub-sequence of time variable content.

6. The method according to claim 5, wherein the sub-sequence of time variable content is a timestamp or a strict monotonic counter.

7. The method according to claim 4, wherein each code sequence of the verification request is generated using a keyed hash function or a message authentication code algorithm.

8. The method according to claim 4, wherein an identification sequence is provisioned at all ones of the plurality of nodes, wherein the one or more sub-sequences further comprises the identification sequence.

9. The method according to claim 4, wherein the identification sequence is a unique identifier of the system comprising the distributed network.

10. An apparatus for verifying secret keys in a distributed network, wherein the network comprises a plurality of nodes connected to a shared medium of the distributed network, wherein each node of the plurality of nodes is member of at least one group of a plurality of groups, wherein each group is associated with a secret group key, wherein each node of the plurality of nodes is provided with only the one or more secret group keys, of which it is member, said apparatus comprising:

a network interface for broadcasting a verification request on the shared medium to be received by the plurality of nodes and for receiving verification responses broadcast from the plurality of nodes on the shared medium, wherein each verification response is broadcast by one of the plurality of nodes, wherein each verification response comprises one code sequence for each logical group, of which the broadcasting node is member, wherein each code sequence of the verification request is generated on the basis of a secret group key associated with a respective logical group from a predefined data sequence, a verification handler for collecting the code sequences comprised in the received verification responses and for confirming integrity of the plurality of nodes by comparing the code sequences.

11. The apparatus according to claim 10, wherein the verification request is an authenticated verification request, which comprises initiator authenticity related information, wherein the initiator authenticity related information enables the plurality of nodes to perform an authentication verification based on the initiator authenticity related information.

12. The apparatus according to claim 10, wherein the verification request further comprises node authenticity related information, which enables the initiator node to perform an authentication verification based on the node authenticity related information.

13. An apparatus for verifying secret keys in a distributed network, wherein the network comprises a plurality of nodes connected to a shared medium of the distributed network, wherein each node of the plurality of nodes is member of at least one group of a plurality of groups, wherein each group is associated with a secret group key, wherein each node of the plurality of nodes is provided with only the one or more secret group keys, of which it is member, said apparatus comprising:

a network interface for receiving a verification request broadcast on the shared medium by an initiator node to be received by a node of the plurality of nodes and for broadcasting a verification response on the shared medium to be received by the initiator node, a key handler for generating a code sequence on the basis of each secret group key associated with a respective one of the one or more logical groups, of which the receiving node is member, from a predefined data sequence and for generating the verification response comprising one code sequence for each of the one or more logical groups, of which the receiving node is member, wherein the initiator node configured to collect the code sequences comprised in verification responses received from the plurality of nodes and to confirm integrity of the plurality of nodes by comparing the code sequences.

14. The apparatus according to claim 13, further comprising:
wherein the key handler is configured to generate the code sequence using a keyed hash function or a message authentication code algorithm.

* * * * *